United States Patent [19]

Johnstone

[11] 4,185,376
[45] Jan. 29, 1980

[54] UNMANNED MACHINING CENTER WITH TOOL CHECKING

[75] Inventor: Richard Johnstone, Brookfield, Wis.

[73] Assignee: Kearney & Trecker Corporation, West Allis, Wis.

[21] Appl. No.: 863,435

[22] Filed: Dec. 22, 1977

[51] Int. Cl.² .............................................. B23Q 3/157
[52] U.S. Cl. ............................................ 29/568; 408/6; 408/56; 409/136
[58] Field of Search ............... 29/568; 90/11 R, 11 E, 90/13 C; 204/56, 61, 6, 11; 214/1 BC; 408/61

[56] References Cited

U.S. PATENT DOCUMENTS

| | | | |
|---|---|---|---|
| 3,513,734 | 5/1970 | Burroughs et al. | 408/56 X |
| 3,576,540 | 4/1971 | Fair | 29/568 X |
| 3,747,085 | 7/1973 | Bala | 408/6 |
| 3,817,647 | 6/1974 | Lemelson | 408/6 X |
| 3,825,245 | 7/1974 | Osburn et al. | 214/1 BC X |
| 4,037,982 | 7/1977 | Clement | 408/61 |

*Primary Examiner*—Gil Weidenfeld
*Attorney, Agent, or Firm*—Cyril M. Hajewski

[57] ABSTRACT

A numerically controlled machining center has a tool magazine, automatic tool changer, workpiece shuttle, and a workpiece magazine which holds enough workpieces for operation by the machining center for an entire shift of approximately eight hours. The numerical controls are programmed to perform predetermined machining operations on each workpiece, in turn, and to replace each finished workpiece with a fresh workpiece at the end of each machining program. A proximity switch is mounted on the machining center for checking tools to detect broken or incorrect tools. The tools are positioned adjacent to the proximity switch and are rotated while the output of the proximity switch is counted for one complete rotation of the tool to determine the number of radially extending teeth on the tool. If the tool has too few or too many teeth, thus indicating a broken or incorrect tool, it is replaced by another tool of the same type. If no alternate tool is available in the tool magazine, the machining cycle is automatically suspended.

7 Claims, 11 Drawing Figures

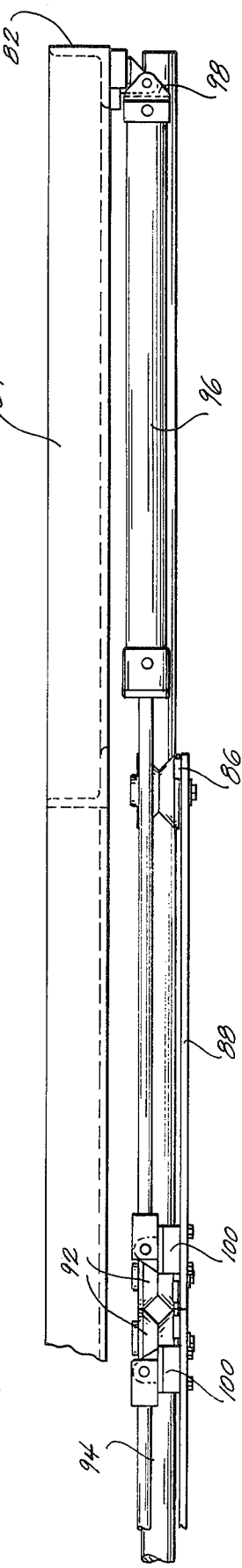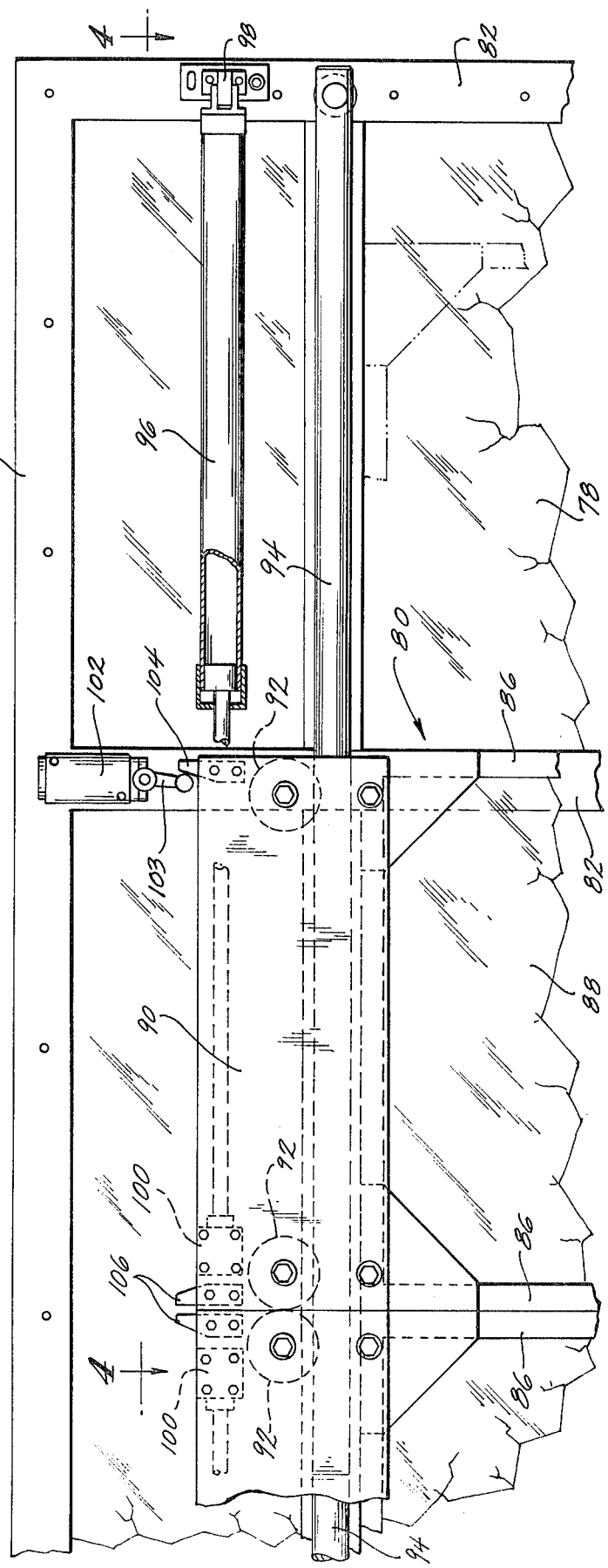

Fig. 5
Fig. 6
Fig. 7
Fig. 8
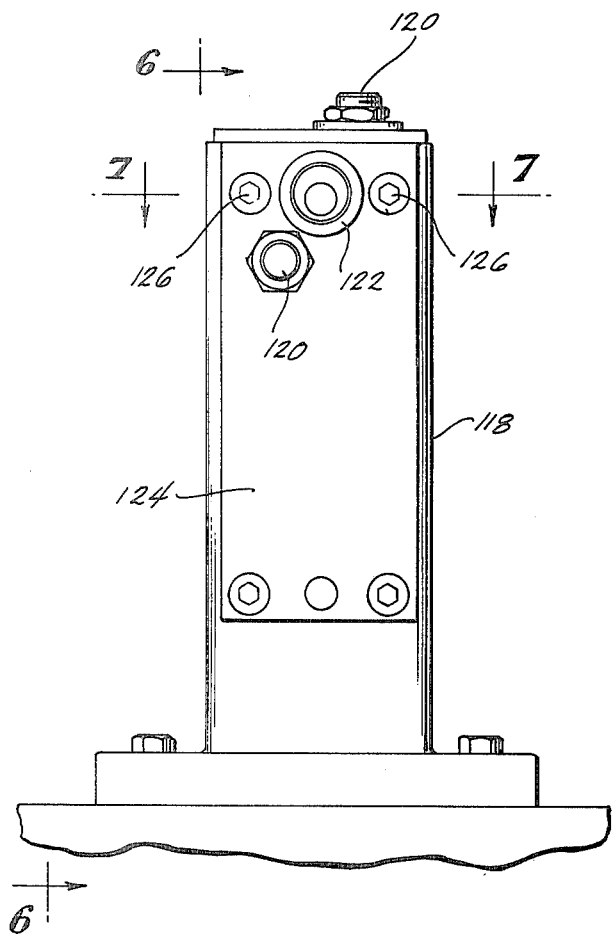
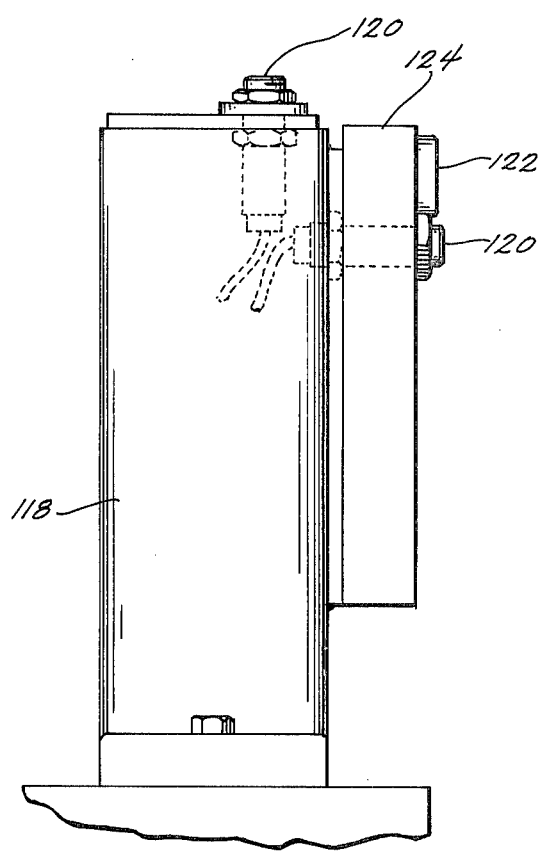
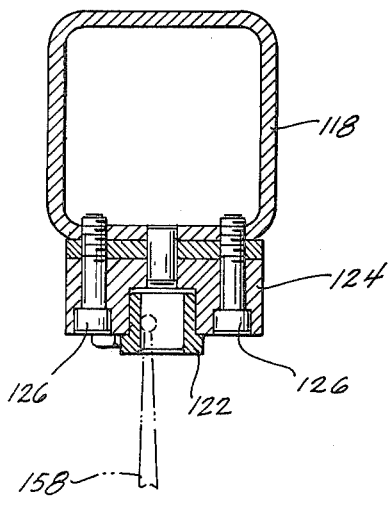
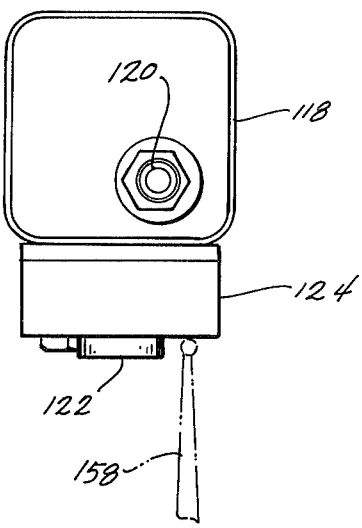

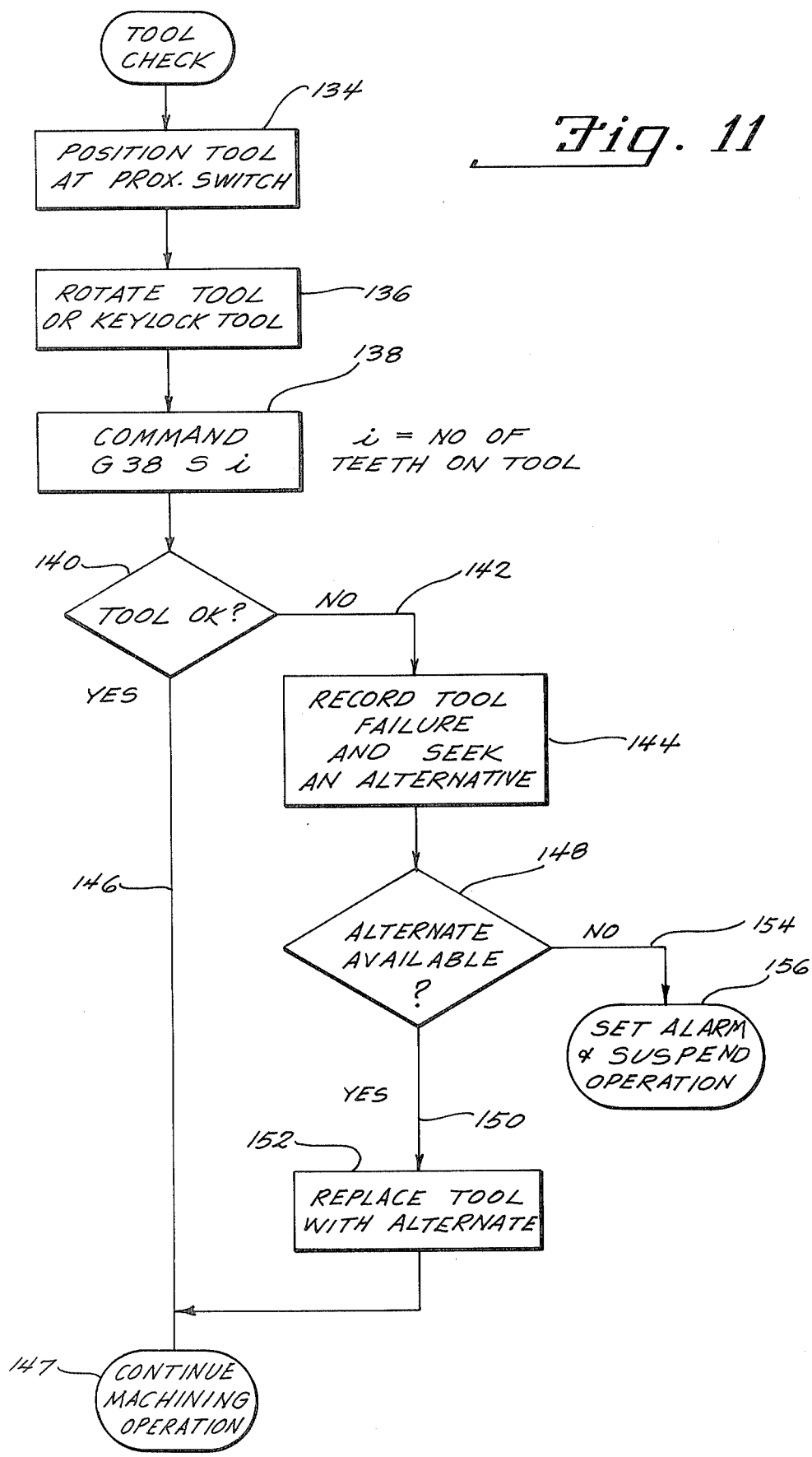

UNMANNED MACHINING CENTER WITH TOOL CHECKING

BACKGROUND OF THE INVENTION

This invention relates to automatic machining centers and has as its principal object to provide a machining center which is so completely automated that it can be reliably operated unattended and unwatched for an entire shift.

Numerically controlled automatic machining centers have been manufactured in the past which can automatically perform a preprogrammed sequence of machining operations. Such machining centers have a plurality of tools which are stored in a tool magazine and are automatically inserted into and removed from the spindle to perform the corresponding machining operations. A machining center of this type is disclosed in U.S. Pat. No. 3,704,510, issued to Robert K. Sedgwick et al, for a "MACHINE TOOL WITH TOOL CHANGER". However, this type of automatic machining center requires the services of a full time operator for loading and unloading the workpieces, starting and stopping the machine for each machining cycle, cleaning out chips, inspecting the tools for excessive wear and breakage, replacing broken or excessively worn tools, compensating for tool wear, etc.

Automatic workpiece handling apparatus has been manufactured in the past, as disclosed in U.S. Pat. No. 3,825,245, issued to John G. Osburn et al, for a "WORKPIECE CHANGER MECHANISM FOR A MACHINE TOOL", and in U.S. Pat. No. 3,796,163, issued to Ronald E. Meyer et al, for a "MANUFACTURING SYSTEM", but such apparatus also requires the services of one or more full time operators.

Apparatus for automatically inspecting tools for excessive wear and breakage and for automatically replacing broken or excessively worn tools has been devised in the past as disclosed in U.S. Pat. No. 3,817,647, issued to Jerome H. Lemelson, for a "TOOL CONTROL ARRANGEMENT", and in U.S. Pat. No. 3,963,364, issued to Jerome H. Lemelson, for a "TOOL CONTROL SYSTEM AND METHOD". However, the machine tools disclosed in the Lemelson patents also require the attention of an operator. In spite of the great strides that have been made in automating machining operations, no prior art machine tool or machining center is known which is capable of operating unattended and unwatched for an entire shift or longer.

SUMMARY OF THE INVENTION

This invention provides an automatic machining center capable of completely unmanned operation for an entire shift or longer. The unmanned machining center of this invention includes a workpiece support, a spindle adapted to hold a cutting tool and to rotate the tool, means for moving the workpiece support and spindle relative to each other to machine a workpiece on the workpiece support with a tool in the tool-holder, a tool magazine for storing a plurality of tools each of which is mountable in the spindle, a tool changer for transferring selected tools from the tool magazine to the spindle and from the spindle back to the tool magazine, a workpiece magazine for storing a plurality of workpieces each of which is mountable on the workpiece support, shuttle means for transferring selected workpieces from the workpiece magazine to the workpiece support and for removing finished workpieces from the workpiece support, and tool checking means for checking to verify the presence of an unbroken tool in the spindle.

The invention also includes a method of checking for broken or incorrect tools by moving the tool tip to a position adjacent to a proximity switch, rotating the tool through one complete revolution, counting the number of output pulses from the proximity switch for one complete revolution of the tool, comparing the total number of output pulses from the proximity switch for one complete revolution of the tool to the number of teeth that should be on the tool, and replacing the tool or suspending the machining operation if the total number of output pulses from the proximity switch for one complete revolution of the tool is different from the number of teeth that should be on the tool as entered into the control system.

Other objects and advantages of the invention will be apparent from the detailed description herein.

DESCRIPTION OF THE DRAWINGS

FIG. 3 is a fragmentary front elevation view of the mechanism for opening and closing the coolant enclosure doors taken on the line 3—3 of FIG. 2;

FIG. 4 is a fragmentary plan view taken on the line 4—4 of FIG. 3;

FIG. 5 is a front elevation view of the housing containing the calibration bushing and proximity switches;

FIG. 6 is a side elevation view taken on the line 6—6 of FIG. 5;

FIG. 7 is a cross-sectional view taken on the line 7—7 of FIG. 5 and showing a probe tip within the calibration bushing;

FIG. 8 is a plan view of the housing of FIGS. 5 to 7 showing a probe tip contacting the Z calibration surface thereof;

FIG. 11 is a flow chart of the program for checking for broken or incorrect tools.

DESCRIPTION OF THE PREFERRED EMBODIMENTS

Figure 1:
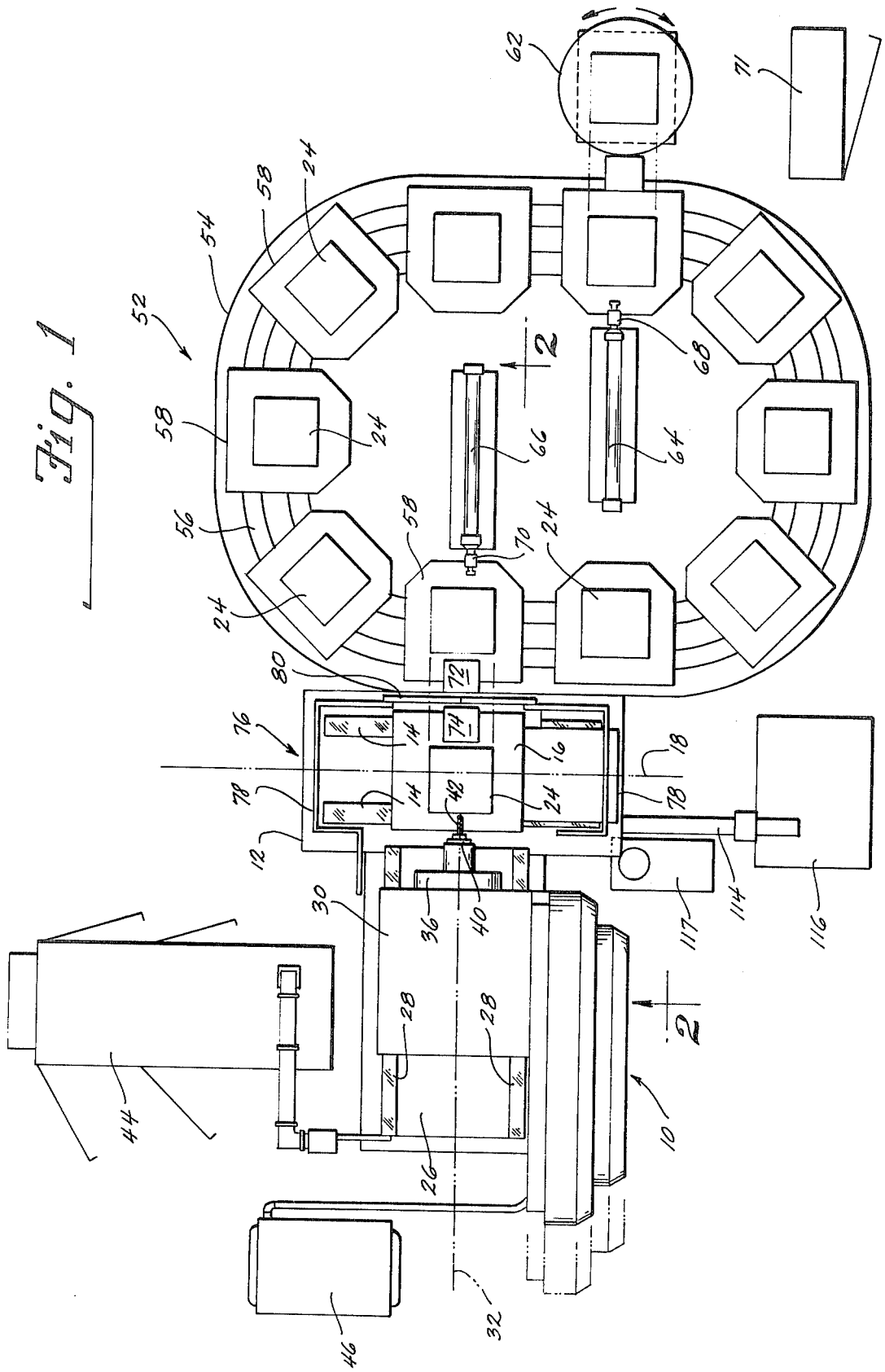
FIG. 1 is a plan view of one preferred embodiment of the invention.
Figure 2:
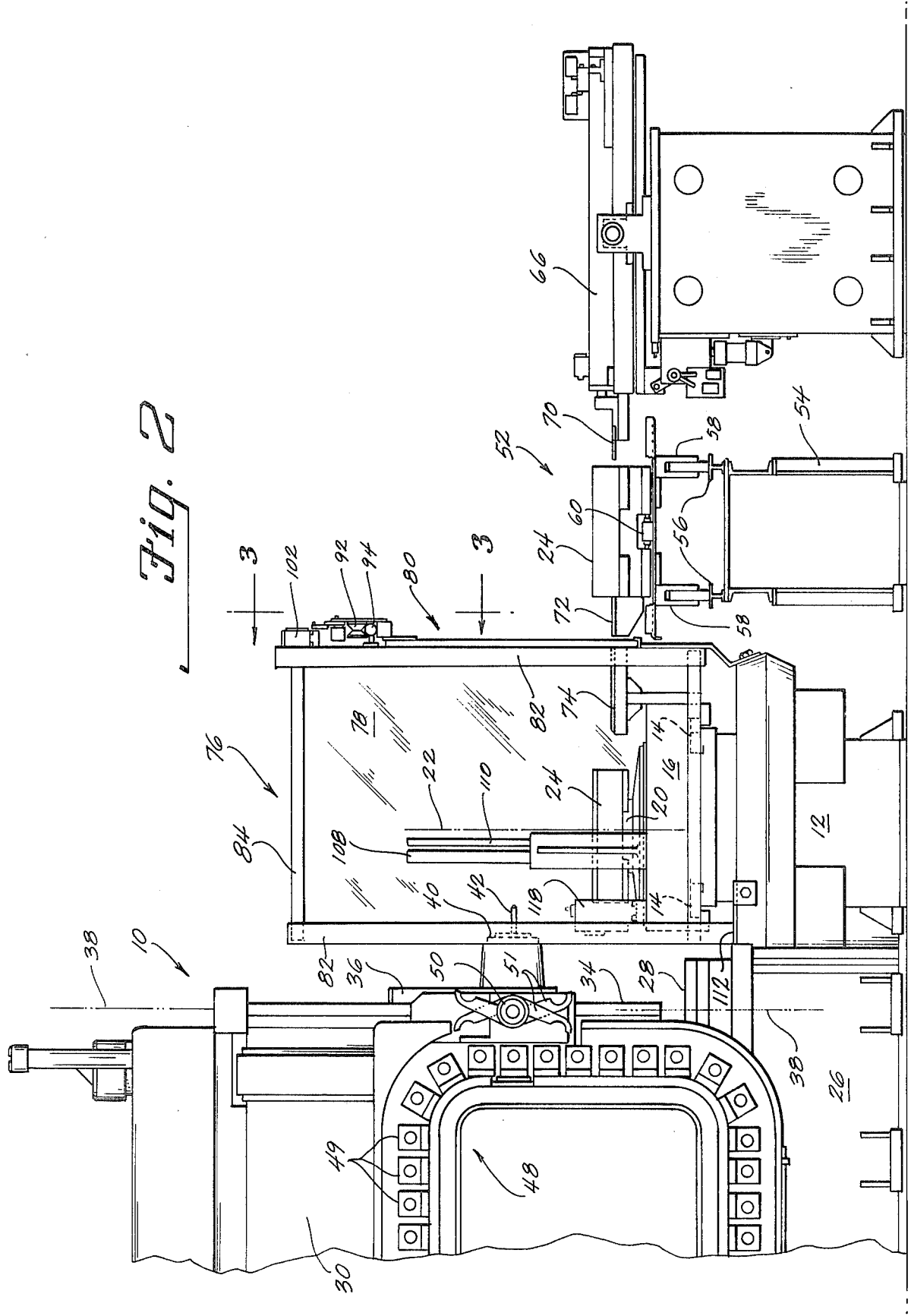
FIG. 2 is a side elevation view and longitudinal sectional view taken on the line 2—2 of FIG. 1.

Referring to FIGS. 1 and 2, one preferred embodiment of the invention includes a horizontal machining center 10 which has a first bed portion 12 that supports horizontal ways 14. A worktable carriage 16 is slidably mounted on ways 14 for movement along a horizontal X-axis 18 (FIG. 1). A worktable 20 (FIG. 2) is rotatably mounted on worktable carriage 16 for rotation about a vertical B-axis 22. Worktable 20 is adapted to slidably receive a conventional pallet 24 and to clamp pallet 24 thereto in position to machine a workpiece (not shown) which is clamped to pallet 24 by conventional means (not shown). Worktable 20 can be indexed to a desired rotary position about B-axis 22 to present any desired face of the workpiece to the cutting tool.

Machining center 10 has a second bed 26 which supports horizontal ways 28. An upright 30 is slidably mounted on ways 28 for movement along a horizontal Z-axis 32 (FIG. 1) which is perpendicular to both X-axis 18 and B-axis 22. Upright 30 supports vertical ways 34

(FIG. 2). A spindlehead 36 is slidably mounted on ways 34 for movement along a vertical Y-axis 38 (FIG. 2) which is perpendicular to both X-axis 18 and Z-axis 32. A spindle 40 which is adapted to receive a cutting tool 42 is rotatably mounted on spindlehead 36 for rotation about Z-axis 32. Rotation of spindle 40 and movement of the other machine tool parts along or around their respective axes is effected by electric motors (not shown) which are controlled by conventional electrical controls (not shown) mounted in a machine control unit and power distribution panel 44 (FIG. 1). A hydraulic unit 46 (FIG. 1) provides hydraulic fluid under pressure for the hydraulic components of the system.

A conventional tool magazine 48 (FIG. 2) having a plurality of tool sockets 49 and a conventional tool changer 50 having a pair of tool change arms 51 are mounted on upright 30 for storing a plurality of cutting tool and for transferring the tools from tool magazine 48 to spindle 40 and vice versa. The tools include a special probe (not shown) which is mounted in a standard toolholder and can be clamped in spindle 40 for calibration purposes as described in later paragraphs. The special probe is illustrated and described in copending U.S. patent application, Ser. No. 805,914, filed on June 13, 1977 now U.S. Pat. No. 4,118,871 issued Oct. 10, 1978, for a "BINARY INSPECTION PROBE FOR NUMERICALLY CONTROLLED MACHINE TOOLS".

A workpiece magazine 52 is mounted on a frame 54 adjacent to bed 12. Workpiece magazine 52 contains a track 56 upon which wheeled carts 58 are movably mounted and can be moved around track 56 by means of a conventional drive chain 60 (FIG. 2) which is driven by conventional means (not shown). Each of the carts 58 is adapted to slidably receive a pallet 24 upon which a workpiece (not shown) is clamped. A pallet loading and unloading station 62 (FIG. 1) is mounted adjacent to track 56 and a hydraulic ram 64 is mounted in position to pull pallets 24 from station 62 to an adjacent cart 58 and to push pallets 24 from cart 58 to station 62. A similar hydraulic ram 66 is mounted in position to push pallets 24 from cart 58 to worktable 20 and to pull pallets 24 from worktable 20 to cart 58. Hydraulic rams 64 and 66 have extendible piston rods which terminate in latch members 68 and 70, respectively, which are shaped to engage a T-shaped recess in pallets 24 for pushing and pulling pallets 24. The electrical controls for rams 64 and 66 and for the workpiece magazine drive are housed in a cabinet 71.

Pallet guideways 72 and 74 are mounted adjacent to worktable 20 to support pallets 24 when they are being transferred from a cart 58 to worktable 20 or vice versa. Guideway 72 is supported by frame 54 while guideway 74 is supported by bed 12.

An enclosure 76 which is closed on three sides by transparent rectangular panels 78 and has a pair of sliding doors 80 on one closed side is mounted on bed 12 in position to enclose worktable 20. The fourth side of enclosure 76 which faces spindle 40 is open to permit machining of the workpiece on pallet 24 inside of enclosure 76. The top of enclosure 76 is also open. Referring to FIG. 2, the side panels 78 are supported by uprights 82 which are attached at their bottom ends to bed 12 and are attached at their top end to cross members 84.

Referring to FIG. 3, a portion of the side of enclosure 76 which faces workpiece magazine 52 is closed by side panels 78 and the central portion thereof is closed by two sliding doors 80. Both sliding doors 80 are identical and therefore only one door 80 will be described in detail. Each sliding door 80 includes a rectangular frame 86 which is covered by a transparent rectangular panel 88 and is bolted at its top edge to a rectangular support plate 90. A pair of rollers 92 are rotatably attached to support plate 90 and roll on a support rod 94 which is attached to uprights 82 and spans the upper edge of the side of enclosure 76 which faces workpiece magazine 52. Support plate 90 is moved laterally between an open and a closed position by a pneumatic ram 96 which is attached at one end to upright 82 by bracket 98 and is attached at the other end to support plate 90 by bracket 100. Pneumatic ram 96 is shown in its fully extended position in FIGS. 3 and 4. This corresponds to the closed position of sliding door 80. In the fully retracted position of pneumatic ram 96, sliding door 80 is moved to the right in FIGS. 3 and 4 to form an opening through which pallets 24 can be moved from workpiece magazine 52 to worktable 20 or vice versa.

The opening and closing of sliding doors 80 is electrically indicated by a three position limit switch 102 having an actuating arm 103 which is spring biased to a central neutral position. When sliding door 80 is fully closed, as shown in FIG. 3, a lug 104 on one end of support plate 90 moves limit switch arm 103 to a first actuated position indicting that door 80 is fully closed. When sliding door 80 is fully opened, a second lug 106 on the other end of support plate 90 moves limit switch arm 103 to a second actuated position indicating that door 80 is fully opened.

The purpose of enclosure 76 is to permit the workpiece on pallet 24 to be sprayed with coolant after it has been machined to wash chips off the workpiece and off pallet 24. The coolant is sprayed from an upstanding conduit 108 (FIG. 2) which has a plurality of orifices (not shown) spaced along its length on the side thereof adjacent to pallet 24. Coolant under pressure is supplied to conduit 108 by a conventional pump (not shown) and is controlled by a conventional solenoid valve (not shown). An upright compressed air conduit 110 (FIG. 2) is mounted beside coolant conduit 108 and also has a plurality of orifices (not shown) spaced along its length on the side thereof adjacent to pallet 24. Compressed air is supplied to conduit 105 by a conventional air compressor (not shown) and is controlled by a conventional solenoid valve (not shown). The purpose of the compressed air is to blow coolant off the workpiece and off pallet 24 after they have been sprayed with coolant to wash away the chips.

When coolant is sprayed through the orifices of coolant conduit 108 to wash away the chips from the workpiece and from the pallet 24 within enclosure 76, worktable 20 is rotated through 360° to present every side of the workpiece and pallet 24 to the jets of coolant issuing from coolant conduit 108. After worktable 20 has rotated through 360°, the flow of coolant is switched off and the compressed air is switched on while worktable 20 continues to rotate through a second 360° to present every side of the workpiece and pallet 24 to the air jets issuing from compressed air conduit.

The chips washed away by the coolant fall into a drain trough 112 (FIG. 2) whose lower surface is part of a chip conveyor belt 114 (FIG. 1) which carries the chips to a chip cart 116 beside the machining center 10. The coolant that was used to wash the chips off the workpiece and off pallet 24 is collected in a conventional drain (not shown) under chip conveyor 114 and is returned to a coolant tank 117 (FIG. 1) by conventional means (not shown). The provision of means for automatically disposing of the chips produced by the machining operation is an important feature of this invention since there is no operator to remove the chips and since a build-up of chips could interfere with the proper functioning of the machining center.

It should be noted that machining center 10 also contains a conventional coolant system (not shown) for applying coolant streams to the cutting tool and to the portion of the workpiece being cut during the machining operation. The purpose of coolant conduit 108 is not to cool the cutting tool during the machining operation, but rather, to wash away the chips after the machining operation is completed.

A small housing 118 (FIGS. 2 and 5 to 8) containing two proximity switches 120 (FIG. 5) and a calibration bushing 122 is rigidly attached to worktable carriage 16 (FIG. 2). Calibration bushing 122 is recessed in a flat plate 124 (FIGS. 5 to 8) which is bolted to housing 118 by bolts 126 (FIGS. 5 and 7). Proximity switches 120 are responsive to the presence of a metallic object within a predetermined distance therefrom and produce an output signal whenever a metallic object is moved within the predetermined distance therefrom.

Figure 10:
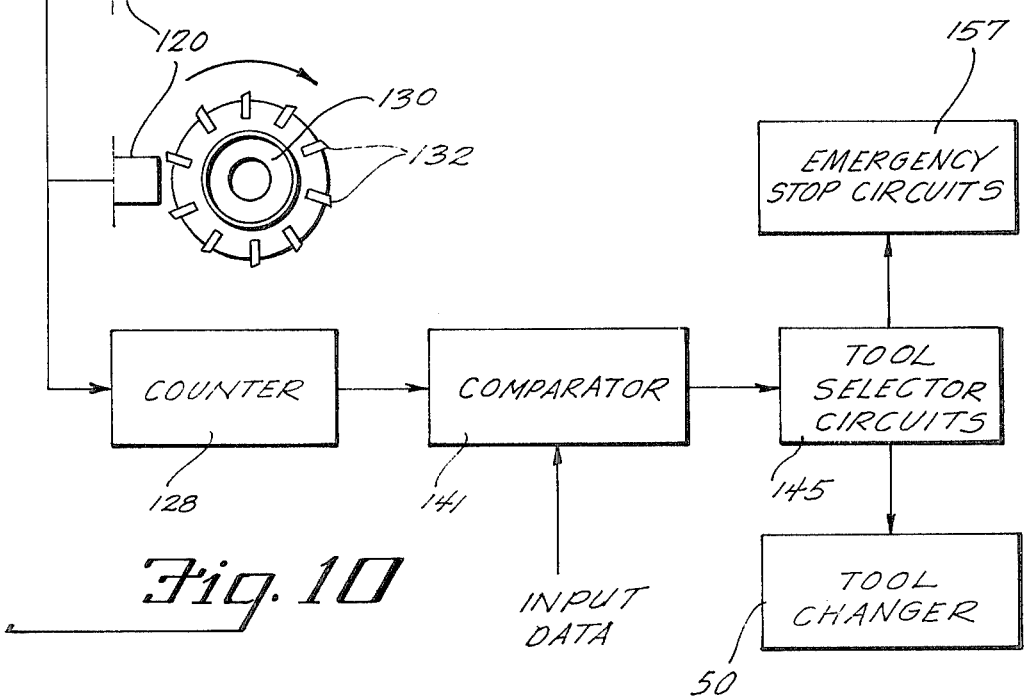
FIG. 10 is a block diagram of the broken tool detector for the embodiment of FIGS. 1 to 8.

FIG. 10 shows the electrical circuit used in combination with proximity switches 120 to check for broken or incorrect tools and FIG. 11 is a flow chart of the program for checking for broken or incorrect tools. Referring to FIG. 10, the output of both proximity switches 120 are connected in parallel to a counter 128. The two switches 120 are oriented at right angles to each other (see FIG. 6) for checking different types of tools. Only one of the switches 120 is used for checking any given tool. In the example shown in FIG. 10, the tool to be checked is a milling cutter 130 which has a plurality of cutting teeth 132 projecting radially therefrom. In this particular example, there are ten radially projecting teeth 132 on cutter 130.

The first step of the tool checking program (FIG. 11) is step 134 in which tool 130 is positioned adjacent to the appropriate proximity switch 120 such that a tooth 132 adjacent to proximity switch 120 will cause an output signal while the valley between teeth 132 will not cause an output signal. Step 134 is initiated in response to a command programmed on the N.C. tape. The command which initiates step 134 includes the X, Y and Z coordinates that spindle 40 must be moved to place tool 130 in the correct position relative to the selected proximity sensor 120. The particular X, Y and Z coordinates will vary for each different tool depending on the dimensions and configuration of the tool.

In the next program step 136, the tool 130 is either rotated through 360° if it has a plurality of teeth or is rotated to position its single tooth opposite proximity switch 120 and is keylocked in that position.

In the next program step 138, the command G38Si is received from the N.C. controls where i=the number of teeth on the selected tool. Step 138 follows step 136 but occurs before rotation of tool 130 is completed. The 360° of rotation through which cutting tool 130 rotates in this example is timed from the trailing edge of a pulse output from counter 128 (FIG. 10) which indicates a valley between two of the teeth 132. Starting from the first detected valley, the tool is rotated for 360° and the number of pulses occurring during the 360° rotation is counted by counter 128.

In the next program step 140, the number in counter 128 is compared to the number received in step 138 to see if the tool under test has the correct number of teeth. If the measured number of teeth is less than it should be, this implies that one or more of the teeth are broken. If the measured number of teeth is greater than it should be, this implies that the wrong tool is in the spindle. In either of these incorrect instances, step 140 selects the NO branch 142 which leads to step 144. If the number in counter 128 is equal to the number received in step 138, step 140 selects YES branch 146 which returns control to the machining operation. This comparison is made in comparator circuit 141 (FIG. 10).

If NO branch 142 is selected, control passes to step 144 in which the tool failure is recorded and the tool selector circuits 145 (FIG. 10) are activated to seek an alternate tool in tool magazine 48. For the purpose of replacing a broken tool, at least two identical tools are stored in tool magazine 48 for any tool that is subject to breakage. If a given tool is liable to break more than once during a shift, three or more of that tool can be stored in tool magazine 48.

Step 144 leads to step 148 in which the availability of an alternate tool is determined. If an alternate tool is available, YES branch 150 is selected which leads to step 152 in which the defective tool is replaced with an alternate tool of the same type. The machining operation is then continued. If an alternate tool is not available, NO branch 154 is selected which leads to step 156 in which an alarm is activated and the machining operation is suspended by emergency stop circuits 157 (FIG. 10).

The use of the previously noted special probe to calibrate the N.C. circuits is illustrated in FIGS. 7 and 8. The probe 158 is moved into contact with the front of plate 124 (see FIG. 8) to calibrate the Z-axis dimension and compensate for temperature expansion or contraction along the Z-axis. To calibrate the X and Y axes dimension and compensate for temperature expansion or contraction along the X and Y axes, probe 158 is moved into contact with the interior of calibration bushing 122, as shown in FIG. 7. Opposite sides of the bushing are contacted for X-axis calibration and the top and bottom are contacted for the Y-axis calibration. By periodically moving probe 158 into contact with the above-noted calibration surfaces and comparing the position of the spindle along the appropriate axis with the position previously recorded for the same calibration surface, thermal growth or contraction can be detected and the N.C. circuits can be recalibrated to compensate for the thermal changes.

As an example of this calibration process, a specific compensation for Z-axis temperature growth will be given. Suppose that the Z-axis displacement of the probe is 87.8976" when the machine is started, i.e., that the Z-axis displacement is 87.8976" at the time that the probe makes contact with the Z-axis calibration surface 124. Suppose that one hour later the measurement is repreated and the Z-axis displacement has changed to 87.8971", indicating a thermal growth along the Z-axis of 0.0005". The N.C. controls will then be programmed to substract 0.0005" from every Z-axis position reading to compensate for this thermal growth. Compensation for the thermal growth or contraction along the X and Y axes is accomplished in the same manner. All three axes are checked and recalibrated periodically. It is important to recalibrate the machine tool automatically during its unmanned operation to prevent errors from creeping in due to thermal growth or contraction. Accordingly, the machine program includes the steps of periodically recalibrating the machine tool at regular intervals, e.g., once an hour. This is an important feature in the unmanned operation because it enables the machine to automatically compensate for temperature changes without the need for an operator for relatively long period of time.

Figure 9:
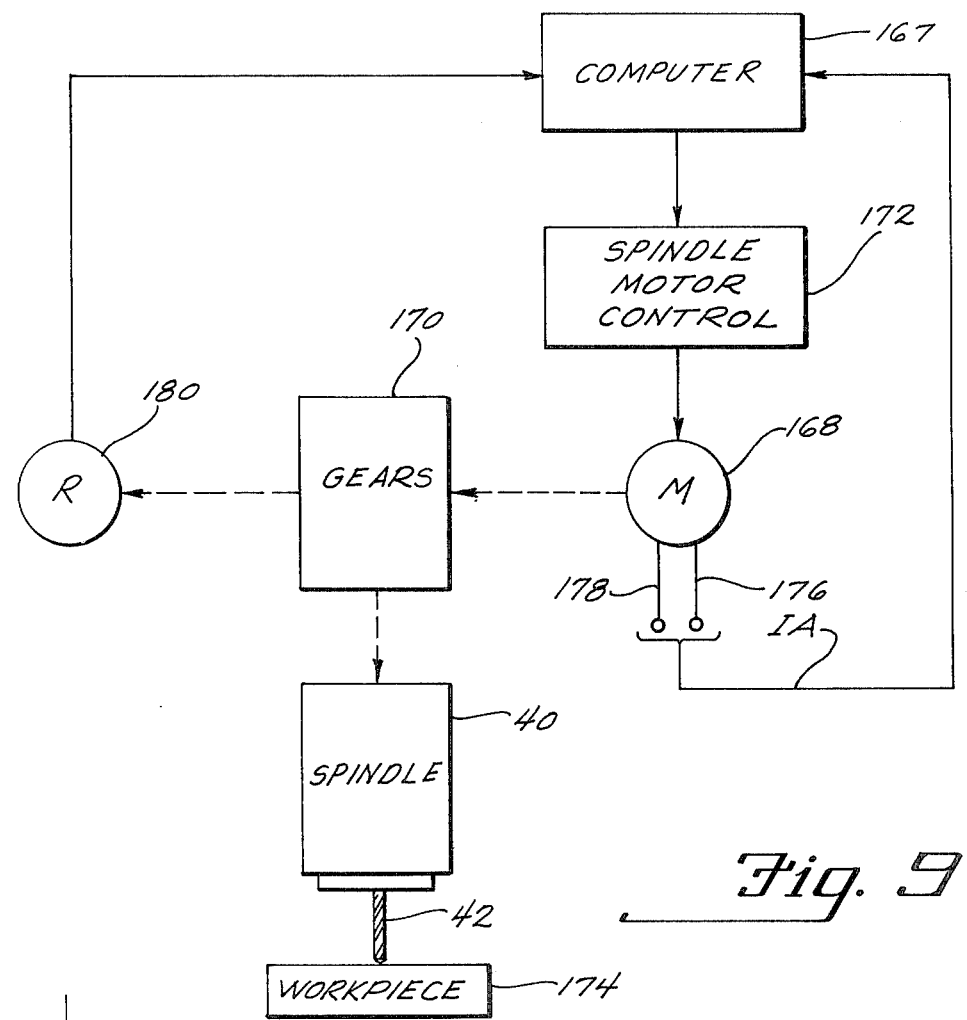
FIG. 9 is a block diagram of the spindle position feedback system for the embodiment of FIGS. 1 to 8.

FIG. 9 shows the position feedback and torque feedback for spindle 40. Spindle 40 is rotated by a D.C. motor 168 through gears 170. Motor 168 is controlled by a conventional motor control circuit 172 which is under the control of computer 167. The armature current IA of motor 168 is applied via conductors 176 and 178 to computer 167. A resolver 180 is coupled to gears 170 and produces an angular position signal for spindle 40 which is applied to computer 167. This angular position signal is used to determine when spindle 40 has rotated through 360° when the number of teeth on the tool is being checked.

Although the illustrative embodiments of the invention have been described in considerable detail for the purpose of disclosing a practical operative structure by which the invention may be practiced advantageously, it is to be understood that the particular apparatus described is intended to be illustrative only and that the novel characteristics of the invention may be incorporated in other structural forms without departing from the spirit and scope of the invention, as defined in the sub-joined claims.

I claim:

1. An unmanned machining center comprising:
   a workpiece support adapted to support a workpiece;
   a spindle adapted to hold a cutting tool and to rotate said cutting tool;
   means for causing relative motion between said workpiece support and said spindle to perform cutting operations on said workpiece;
   a tool magazine adapted to hole a plurality of cutting tools;
   tool changer means for transferring tools from said tool magazine to said spindle and from said spindle back to said tool magazine;
   a workpiece magazine adapted to hold a plurality of workpieces;
   shuttle means for transferring workpieces from said workpiece magazine to said workpiece support, and from said workpiece support back to said workpiece magazine;
   means for counting the number of teeth on a tool in said spindle;
   means for comparing the counted number of teeth to a recorded number which signifies the number of teeth that should be on the tool; and
   means for automatically replacing a broken or incorrect tool with another tool of the same type from said tool magazine.

2. The unmanned machining center according to claim 1 wherein said means for counting the number of teeth on a tool includes:
   a proximity sensor which is operable to produce an output signal when a metal surface is within a predetermined distance therefrom, said proximity sensor being mounted in a position in which a tool in said spindle can be moved close enough to said proximity sensor so that as the tool is rotated each of its teeth produces an individual output signal therefrom.

3. An unmanned machining center according to claim 2 and also including:
   means for determining the angular position of a tool said spindle.

4. An unmanned machining center according to claim 2 wherein said proximity sensor is mounted in a housing and also including calibration surfaces on said housing.

5. An unmanned machining center according to claim 1 and also including:
   means for automatically removing chips from a workpiece on said workpiece support after the machining operation on said workpiece is completed.

6. An unmanned machining center comprising:
   a workpiece support adapted to support a workpiece;
   a spindle adapted to hold a cutting tool and to rotate said cutting tool;
   means for causing relative motion between said workpiece support and said spindle to perform cutting operations on said workpiece;
   a tool magazine adapted to hold a plurality of cutting tools;
   tool changer means for transferring tools from said tool magazine to said spindle and from said spindle back to said tool magazine;
   a workpiece magazine adapted to hold a plurality of workpieces;
   shuttle means for transferring workpieces from said workpiece magazine to said workpiece support, and from said workpiece support back to said workpiece magazine;
   tool checking means for checking the tool in said spindle;
   means for automatically replacing a broken or incorrect tool with another tool of the same type from said tool magazine;
   means for applying a stream of liquid to said workpiece to wash chips off the workpiece; and
   means for applying a stream of gas to said workpiece to remove the liquid therefrom.

7. An unmanned machining center according to claim 6 and also including:
   means for rotating said workpiece through 360° while said liquid and gas streams are applied thereto.

* * * * *

Disclaimer 4,185,376.—*Richard Johnstone*, Brookfield, Wis. UNMANNED MACHINING CENTER WITH TOOL CHECKING. Patent dated Jan. 29, 1980. Disclaimer filed Aug. 27, 1984, by the assignee, *Kearney & Trecker Corp.*

Hereby enters this disclaimer to claims 6 and 7 of said patent.

[*Official Gazette October 23, 1984.*]